(12) United States Patent
Son et al.

(10) Patent No.: US 9,876,211 B2
(45) Date of Patent: Jan. 23, 2018

(54) SEPARATION MEMBRANE AND LITHIUM-SULFUR BATTERY COMPRISING SAME

(71) Applicant: LG CHEM, LTD., Seoul (KR)

(72) Inventors: Byoungkuk Son, Daejeon (KR); Seong Ho Lee, Daejeon (KR); Minchul Jang, Daejeon (KR); Hyungsam Choi, Daejeon (KR); Joong Jin Han, Daejeon (KR); Min Seo Kim, Daejeon (KR); Suhwan Kim, Daejeon (KR); Seungpyo Jeong, Daejeon (KR); Yu Mi Kim, Daejeon (KR); Da Young Sung, Daejeon (KR); Youngjea Kim, Daejeon (KR); Gi Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 15/029,723

(22) PCT Filed: Sep. 29, 2014

(86) PCT No.: PCT/KR2014/009122
§ 371 (c)(1),
(2) Date: Apr. 15, 2016

(87) PCT Pub. No.: WO2015/056907
PCT Pub. Date: Apr. 23, 2015

(65) Prior Publication Data
US 2016/0233475 A1    Aug. 11, 2016

(30) Foreign Application Priority Data
Oct. 18, 2013   (KR) ................. 10-2013-0124887

(51) Int. Cl.
*H01M 2/16*      (2006.01)
*H01M 4/136*     (2010.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
CPC .......... H01M 10/052; H01M 10/0525; H01M 10/0568; H01M 10/0569; H01M 10/058;
(Continued)

(56) References Cited

U.S. PATENT DOCUMENTS

2002/0037457 A1   3/2002   Choi
2002/0102455 A1   8/2002   Daroux et al.
(Continued)

FOREIGN PATENT DOCUMENTS

DE   10 2011 079 662 A1   1/2013
EP          2639 854 A1   9/2013
(Continued)

OTHER PUBLICATIONS

European Search Report for Appl. No. 14854314.3 dated Mar. 24, 2017.
(Continued)

*Primary Examiner* — Carlos Barcena
(74) *Attorney, Agent, or Firm* — Birch, Stewart, Kolasch & Birch, LLP

(57) ABSTRACT

The present application relates to a separation membrane and a lithium-sulfur battery including the same, and the separation membrane according to the present application prevents elution of lithium polysulfide in a cathode and suppresses growth of a lithium dendrite generated in an anode, and thus has an effect that a life-span and safety of the battery are improved.

17 Claims, 1 Drawing Sheet

(51) Int. Cl.
*H01M 4/134* (2010.01)
*H01M 4/62* (2006.01)
*H01M 4/66* (2006.01)
*H01M 4/38* (2006.01)
*H01M 10/0568* (2010.01)
*H01M 10/0569* (2010.01)
*H01M 10/0525* (2010.01)
*H01M 2/14* (2006.01)
*H01M 10/052* (2010.01)
*H01M 4/58* (2010.01)
*H01M 4/04* (2006.01)
*H01M 4/1397* (2010.01)
*H01M 10/058* (2010.01)
*H01M 4/02* (2006.01)

(52) U.S. Cl.
CPC ....... *H01M 2/1646* (2013.01); *H01M 2/1653* (2013.01); *H01M 4/134* (2013.01); *H01M 4/136* (2013.01); *H01M 4/38* (2013.01); *H01M 4/382* (2013.01); *H01M 4/623* (2013.01); *H01M 4/625* (2013.01); *H01M 4/661* (2013.01); *H01M 10/052* (2013.01); *H01M 10/0525* (2013.01); *H01M 10/0568* (2013.01); *H01M 10/0569* (2013.01); *H01M 4/0404* (2013.01); *H01M 4/1397* (2013.01); *H01M 4/5815* (2013.01); *H01M 10/058* (2013.01); *H01M 2004/027* (2013.01); *H01M 2004/028* (2013.01); *H01M 2220/20* (2013.01)

(58) Field of Classification Search
CPC ..... H01M 2004/027; H01M 2004/028; H01M 2220/20; H01M 2/145; H01M 2/1646; H01M 2/1653; H01M 2/166; H01M 2/1686; H01M 4/0404; H01M 4/134; H01M 4/136; H01M 4/1397; H01M 4/38; H01M 4/382; H01M 4/5815; H01M 4/623; H01M 4/625; H01M 4/661
See application file for complete search history.

(56) References Cited

U.S. PATENT DOCUMENTS

| | | |
|---|---|---|
| 2007/0122716 A1 | 5/2007 | Seo et al. |
| 2008/0292968 A1 | 11/2008 | Lee et al. |
| 2010/0178545 A1 | 7/2010 | Pan et al. |
| 2012/0052339 A1 | 3/2012 | Mikhaylik et al. |
| 2012/0301774 A1 | 11/2012 | Jiang et al. |
| 2014/0234692 A1 | 8/2014 | Wegner et al. |

FOREIGN PATENT DOCUMENTS

| | | |
|---|---|---|
| JP | 2009-518809 A | 5/2009 |
| KR | 10-2001-0111831 A | 12/2001 |
| KR | 10-2007-0055979 A | 5/2007 |
| KR | 10-2009-0088636 A | 8/2009 |
| KR | 10-2009-0118089 A | 11/2009 |
| KR | 10-2013-0003592 A | 1/2013 |
| KR | 10-2013-0105839 A | 9/2013 |

OTHER PUBLICATIONS

International Search Report, issued in PCT/KR2014/009122, dated Jan. 14, 2015.

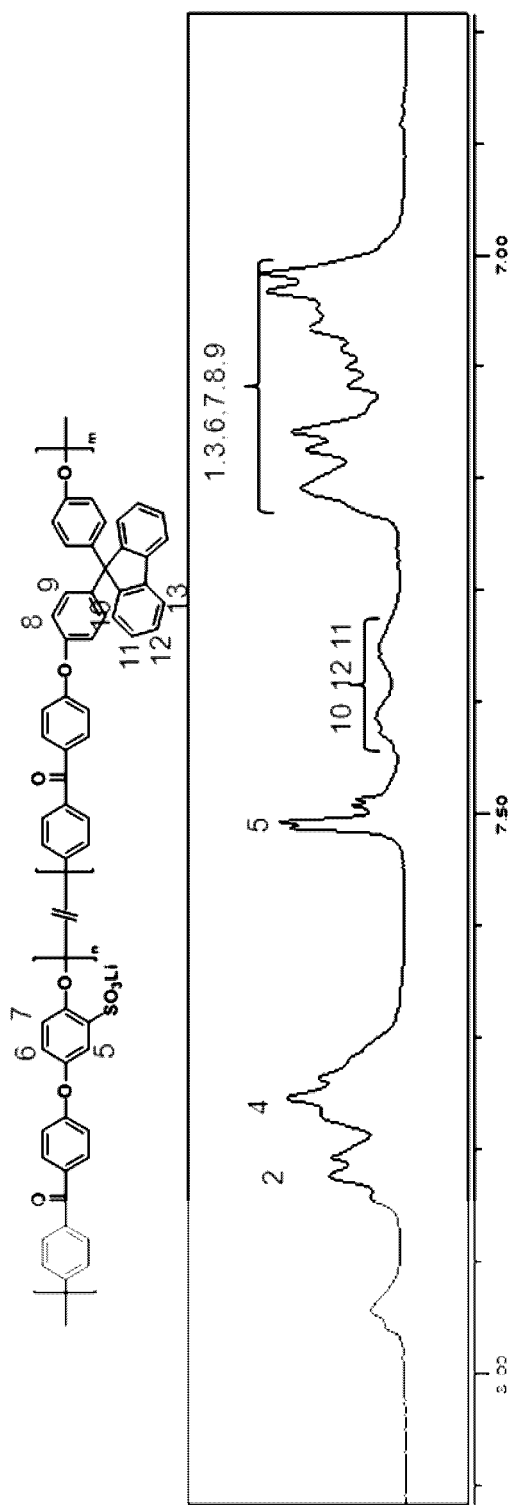

SEPARATION MEMBRANE AND LITHIUM-SULFUR BATTERY COMPRISING SAME

TECHNICAL FIELD

This application claims priority from Korean Patent Application No. 10-2013-0124887 filed on Oct. 18, 2013, in the KIPO, the disclosure of which is incorporated herein by reference in its entirety.

The present application relates to a separation membrane and a lithium-sulfur battery including the same.

BACKGROUND ART

A lithium-sulfur battery is a secondary battery where a sulfur-based compound having a sulfur-sulfur bond is used as a positive electrode active material and a carbon-based material in which intercalation and deintercalation of an alkali metal such as lithium or a metal ion such as a lithium ion occur is used as a negative electrode active material. Electric energy is stored and generated by using an oxidation-reduction reaction where an oxidation number of sulfur is reduced while the sulfur-sulfur bond is broken during discharging, which is a reduction reaction, and the sulfur-sulfur bond is formed again while the oxidation number of sulfur is increased during charging, which is an oxidation reaction.

In the lithium-sulfur battery, in the case where a lithium metal is used as the negative electrode active material, an energy density is 3,830 mAh/g, and in the case where sulfur ($S_8$) is used as the positive electrode active material, the energy density is 1,675 mAh/g, and thus the lithium-sulfur battery is a promising battery in terms of energy density. Further, there is a merit in that a sulfur-based material used as the positive electrode active material is a low-priced and environmentally-friendly material.

However, there is a problem in that since electric conductivity of sulfur is $5 \times 10^{-30}$ S/cm and thus sulfur is close to a nonconductor, it is difficult to move electrons generated by an electrochemical reaction. Accordingly, an electric conductive material such as a carbon providing a smooth electrochemical reaction site needs to be used. In this case, there are problems in that in the case where the conductive material and sulfur are simply mixed to be used, sulfur flows out to an electrolyte during the oxidation-reduction reaction to reduce a battery life-span, and in the case where an appropriate electrolytic solution is not selected, lithium polysulfide that is a reduction material of sulfur is eluted, and thus sulfur does not participate in the electrochemical reaction any longer.

Therefore, there is a demand for developing a technology for reducing an outflow of sulfur to the electrolyte and improving performance of the battery.

PRIOR ART DOCUMENT

Patent Document

Korean Patent Application Laid-Open No. 10-2001-0111831

DISCLOSURE

Technical Problem

The present application has been made in an effort to provide a separation membrane that can prevent elution of lithium polysulfide in a cathode of a lithium-sulfur battery and suppress growth of a lithium dendrite generated in an anode.

Further, the present application has been made in an effort to provide a lithium-sulfur battery to which the separation membrane is applied.

The problems to be solved by the present application are not limited to the aforementioned technical problems, and other unmentioned technical problems may be clearly understood by a person with skill in the art from the following description.

Technical Solution

An exemplary embodiment of the present application provides a separation membrane including: a first layer including a lithium ion conductive compound having one or more functional groups selected from —$SO_3Li$, —$COOLi$, and —$OLi$; and a second layer including an inorganic oxide particle and a binder.

Another exemplary embodiment of the present application provides a lithium-sulfur battery including: a cathode; an anode; and the separation membrane positioned between the cathode and the anode.

Yet another exemplary embodiment of the present application provides a battery module including the lithium-sulfur battery as a unit battery.

Still another exemplary embodiment of the present application provides a method for preparing the separation membrane including: forming a first layer including a lithium ion conductive compound having one or more functional groups selected from —$SO_3Li$, —$COOLi$, and —$OLi$; and forming a second layer including an inorganic oxide particle and a binder on the first layer.

Still yet another exemplary embodiment of the present application provides a method for preparing a lithium-sulfur battery including: assembling the separation membrane, a cathode, and an anode, in which the assembling is performed so that a first layer of the separation membrane is closer to the cathode and a second layer of the separation membrane is closer to the anode.

Advantageous Effects

There is an effect that a separation membrane according to an exemplary embodiment of the present application is applied to a lithium-sulfur battery to prevent elution of lithium polysulfide in a cathode and suppress growth of a lithium dendrite in an anode and thus prevent a short-circuit. Accordingly, there is an effect that a life-span and safety of the battery are improved.

DESCRIPTION OF DRAWINGS

FIG. 1 is an NMR graph illustrating a confirmation result of synthesis of a copolymer prepared according to Preparation Example 1 of the present application.

MODE FOR INVENTION

Advantages and characteristics of the present application, and methods for achieving them will be apparent with reference to embodiments described below in detail in addition to the accompanying drawings. However, the present application is not limited to the exemplary embodiments to be disclosed below but may be implemented in various forms. Therefore, exemplary embodiments introduced herein are provided to make disclosed contents thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used herein, including technical or scientific terms, have the same meanings as those commonly understood by those skilled in the art to which the present application belongs. Further, terms defined in a generally used dictionary are not to be interpreted to have idealized or excessively formal meanings unless clearly defined in the present invention.

Hereinafter, the present application will be described in detail.

An exemplary embodiment of the present application provides a separation membrane including a first layer including a lithium ion conductive compound having one or more functional groups selected from —SO$_3$Li, —COOLi, and —OLi; and a second layer including an inorganic oxide particle and a binder.

In the exemplary embodiment of the present application, the first layer and the second layer may be provided to come into contact with each other. That is, the first layer and the second layer may come into contact with each other to form a film type.

In the exemplary embodiment of the present application, the separation membrane may further include a third layer including a porous base material provided between the first layer and the second layer. The base material may serve as a support for forming the first layer and the second layer.

According to the exemplary embodiment of the present application, a pore of the porous base material may be incorporated by a material of the first layer and/or the second layer.

According to the exemplary embodiment of the present application, a porosity of the first layer may be 5% or less. When the porosity of the first layer is 5% or less, there is an effect that diffusion of lithium polysulfide into an anode is prevented to improve a life-span property.

The exemplary embodiment of the present application provides a lithium-sulfur battery including a cathode; an anode; and the separation membrane positioned between the cathode and the anode, in which a first layer of the separation membrane is provided to be closer to the cathode and a second layer of the separation membrane is provided to be closer to the anode.

According to the exemplary embodiment of the present application, the first layer of the separation membrane may be provided to come into contact with the cathode and the second layer of the separation membrane may be provided to come into contact with the anode.

There is an effect that the separation membrane of the present application is applied to the lithium-sulfur battery to prevent elution of lithium polysulfide in the cathode and suppress growth of a lithium dendrite in the anode and thus prevent a short-circuit. Accordingly, there is an effect that a life-span and safety of the battery are improved.

In the related art, there is a problem in that lithium polysulfide generated in the cathode including sulfur is dissolved out in an electrolyte during charging and discharging of the lithium-sulfur battery to be oxidized in a negative electrode and thus an electrode capacity is reduced. Further, since a short-circuit of the battery occurs due to growth of the lithium dendrite during charging and discharging of the lithium negative electrode, there is a problem in safety of the battery.

The separation membrane according to the exemplary embodiment of the present application has a multilayered structure including the first layer and the second layer, and thus may simultaneously exhibit a life-span property of the battery and an effect of safety according to suppression of growth of the dendrite. Specifically, since the separation membrane may pass lithium ions and prevent movement of lithium polysulfide by a lithium ion conductive compound included in the first layer, a problem of reduction of the electrode capacity caused by moving lithium polysulfide to the negative electrode to oxidize lithium polysulfide can be solved. Further, the inorganic oxide particle included in the second layer of the separation membrane may physically block growth of the dendrite in the lithium negative electrode to prevent occurrence of the short-circuit of the battery and improve safety of the battery.

In the case where the first layer and the second layer of the separation membrane are formed of one layer, diffusion of lithium polysulfide into an interface between the lithium ion conductive compound and the inorganic oxide particle is promoted to reduce the life-span property of the battery, and thus it is preferable that the first layer and the second layer be formed of multiple layers.

The lithium ion conductive compound may include a repeating unit represented by the following Chemical Formula D.

[Chemical Formula D]

In Chemical Formula D,

R is a hydrocarbon group unsubstituted or substituted by at least one selected from a group consisting of fluorine, oxygen, nitrogen, and sulfur, X is —SO$_3$Li, —COOLi, or —OLi, and y is 1 to 100,000.

In the present specification, the "hydrocarbon group" means a group having a carbon frame, and in the carbon frame, carbon (C) may be replaced by at least one selected from a group consisting of oxygen (O), nitrogen (N), and sulfur (S), hydrogen (H) may be replaced by halogen, particularly fluorine (F), and the hydrocarbon group may have a substituent group or a connection group.

Chemical Formula D means a hydrocarbon-based compound having one or more substituent groups selected from —SO$_3$Li, —COOLi, and —OLi.

According to the exemplary embodiment of the present application, a capping group of the lithium ion conductive compound including the repeating unit represented by Chemical Formula D may be selected from hydrogen, a halogen group, a hydroxy group, and an amine group.

A weight average molecular weight of the repeating unit represented by Chemical Formula D may be 500 to 5,000,000.

According to the exemplary embodiment of the present application, Chemical Formula D may be represented by the following Chemical Formula E.

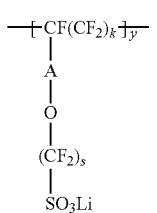
[Chemical Formula E]

In Chemical Formula E,
A is —OCF$_2$CF(CF$_3$)— or a direct bond,
k is an integer of 1 to 30,
s is an integer of 1 to 10, and
y is an integer of 1 to 100,000.

According to the exemplary embodiment of the present application, Chemical Formula E may be represented by the following Chemical Formula E-1, Chemical Formula E-2, Chemical Formula E-3, or Chemical Formula E-4.

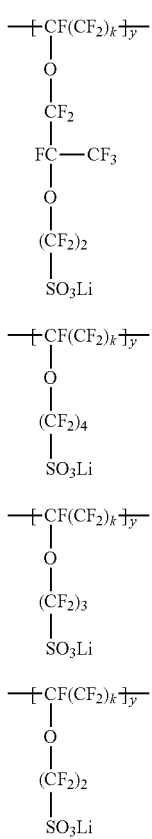
[Chemical Formula E-1]
[Chemical Formula E-2]
[Chemical Formula E-3]
[Chemical Formula E-4]

In Chemical Formulas E-1 to E-4, k and y are the same as those defined in Chemical Formula E.

The lithium ion conductive compound may be one or two or more polymers selected from a group consisting of a sulfonated styrene unit, a sulfonated poly(arylene ether) unit, a sulfonated polyaryleneetherketone unit, a sulfonated fluorocarbon-based unit, a carboxylated carbon-based unit, and a hydroxylated carbon-based unit, and may be a compound where hydrogen cations of one or more functional groups selected from a sulfonic acid group, a carboxyl group, and a hydroxyl group included in the polymer are substituted by lithium cations.

Specific examples thereof may include one or two or more copolymers selected from a group consisting of a sulfonated styrene unit where hydrogen cations of a sulfonic acid group are substituted by lithium cations, a sulfonated poly(arylene ether) unit where hydrogen cations of a sulfonic acid group are substituted by lithium cations, a sulfonated polyaryleneetherketone unit where hydrogen cations of a sulfonic acid group are substituted by lithium cations, a sulfonated fluorocarbon-based unit where hydrogen cations of a sulfonic acid group are substituted by lithium cations, a carboxylated carbon-based unit where hydrogen cations of a carboxyl group are substituted by lithium cations, and a hydroxylated carbon-based unit where hydrogen cations of a hydroxyl group are substituted by lithium cations.

According to the exemplary embodiment of the present application, the lithium ion conductive compound may include a copolymer including a repeating unit of the following Chemical Formula A and a repeating unit of the following Chemical Formula B.

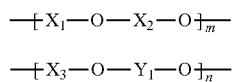
[Chemical Formula A]

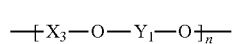
[Chemical Formula B]

In Chemical Formulas A and B,
m and n mean a number of the repeating units,
1≤m≤500 and 1≤n≤500,
$X_1$, $X_2$, and $X_3$ are the same as or different from each other, and are each independently represented by any one of the following Chemical Formulas 1 to 3,
$Y_1$ is represented by any one of the following Chemical Formulas 4 to 6,

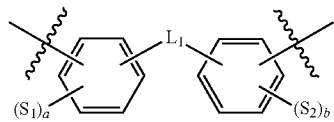
[Chemical Formula 1]

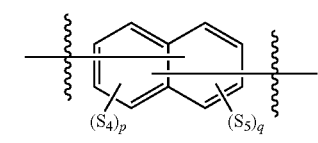
[Chemical Formula 2]

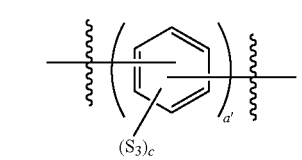
[Chemical Formula 3]

in Chemical Formulas 1 to 3,
$L_1$ is a direct connection, or any one of —CZ$_2$Z$_3$—, —CO—, —O—, —S—, —SO$_2$—, —SiZ$_2$Z$_3$—, and a substituted or unsubstituted fluorenyl group,
$Z_2$ and $Z_3$ are the same as or different from each other, and are each independently any one of hydrogen, an alkyl group, a trifluoromethyl group (—CF$_3$), and a phenyl group,
$S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, a, b, c, p, and q are the same as or different from each other, and are each independently an integer of 0 or more and 4 or less, a' is an integer of 1 or more and 5 or less,

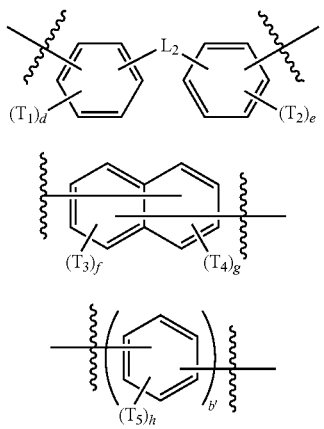

[Chemical Formula 4]

[Chemical Formula 5]

[Chemical Formula 6]

in Chemical Formulas 4 to 6, $L_2$ is a direct connection, or any one selected from —CO—, —SO$_2$—, and a substituted or unsubstituted fluorenyl group, d, e, f, g, and h are the same as or different from each other, and are each independently an integer of 0 or more and 4 or less, b' is an integer of 1 or more and 5 or less, and $T_1$ to $T_5$ are the same as or different from each other, at least one of $T_1$ to $T_5$ is each independently —SO$_3$Li, —COOLi, or —OLi and residuals are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

In the present specification,

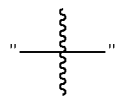

represents a position which can be bonded to the adjacent substituent group.

Examples of the substituent groups will be described below, but are not limited thereto.

In the present specification, examples of the halogen group include fluorine, chlorine, bromine, or iodine.

In the present specification, the alkyl group may be a straight or branch chain, and the number of carbon atoms thereof is not particularly limited but it is preferable that the number may be 1 to 60, specifically 1 to 40, and more specifically 1 to 20. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be a straight or branch chain, and the number of carbon atoms thereof is not particularly limited but it is preferable that the number may be 2 to 60, specifically 2 to 40, and more specifically 2 to 20.

In the present specification, the alkoxy group may be a straight or branch chain, and the number of carbon atoms thereof is not particularly limited but it is preferable that the number may be 1 to 60, specifically 1 to 40, and more specifically 1 to 20.

In the present specification, the cycloalkyl group is not particularly limited, but it is preferable that the number of carbon atoms thereof may be 3 to 60, specifically 3 to 40, and more specifically 5 to 20, and particularly, a cyclopentyl group and a cyclohexyl group are preferable.

In the present specification, the heterocycloalkyl group includes one or more of S, O, and N and is not particularly limited, but it is preferable that the number of carbon atoms thereof may be 2 to 60, specifically 2 to 40, and more specifically 3 to 20, and particularly, a cyclopentyl group and a cyclohexyl group are preferable.

In the present specification, the number of carbon atoms of the amine group is not particularly limited but it is preferable that the number may be 1 to 60, specifically 1 to 40, and more specifically 1 to 20. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the aryl group may be a monocyclic type or a polycyclic type, and the number of carbon atoms thereof is not particularly limited but it is preferable that the number may be 6 to 60, specifically 6 to 40, and more specifically 6 to 20. Specific examples of the aryl group include monocyclic aromatics such as a phenyl group, a biphenyl group, a triphenyl group, a terphenyl group, and a stilbene group, polycyclic aromatics such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, and a fluoranthene group, and the like, but are not limited thereto.

In the present specification, the heteroaryl group includes one or more of S, O, and N as a heteroatom, and the number of carbon atoms thereof is not particularly limited, but it is preferable that the number may be 2 to 60, specifically 2 to 40, and more specifically 3 to 20. Specific examples of the heteroaryl group include pyridyl, pyrrolyl, pyrimidyl, pyridazinyl, furanyl, thienyl, imidazolyl, pyrazolyl, oxazolyl, isoxazolyl, thiazolyl, isothiazolyl, triazolyl, furazanyl, oxadiazolyl, thiadiazolyl, dithiazolyl, tetrazolyl, pyranyl, thiopyranyl, diazinyl, oxazinyl, triazinyl, dioxynyl, triazinyl, tetrazinyl, quinolyl, isoquinolyl, quinazolinyl, isoquinazolinyl, acridinyl, phenanthridinyl, imidazopyridinyl, diazanaphthalenyl, triazaindene, indolyl, benzothiazolyl, benzoxazolyl, benzimidazolyl, a benzothiophene group, a benzofuran group, a dibenzothiophene group, a dibenzofuran group, carbazolyl, benzocarbazolyl, phenazinyl, or a condensation cycle thereof, but are not limited thereto.

In the present specification, the fluorenyl group may be substituted by other substituent groups, and the substituent groups may be bonded to each other to form a cycle. Examples thereof include

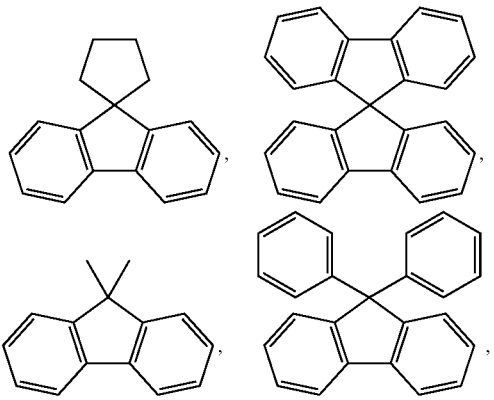

and the like.

In the present specification, the term "substituted or unsubstituted" means that there is no substitution or substitution is performed by one or more substituent groups selected from a group consisting of deuterium; a halogen group; a nitrile group; a nitro group; a hydroxy group; a cyano group; $C_1$ to $C_{60}$ straight- or branch-chained alkyl; $C_2$ to $C_{60}$ straight- or branch-chained alkenyl; $C_2$ to $C_{60}$ straight- or branch-chained alkynyl; $C_3$ to $C_{60}$ monocyclic or polycyclic cycloalkyl; $C_2$ to $C_{60}$ monocyclic or polycyclic heterocycloalkyl; $C_6$ to $C_{60}$ monocyclic or polycyclic aryl; and $C_2$ to $C_{60}$ monocyclic or polycyclic heteroaryl, or means that there is no substitution or substitution is performed by a substituent group having a structure where two or more selected from a group consisting of the exemplified substituent groups are connected. As described above, when the substituent group has the structure where two or more substituent groups are connected, the two or more substituent groups may be the same as or different from each other.

In the exemplary embodiment of the present application, m and n may mean the number of repeating units and $2 \leq m \leq 200$ and $2 \leq n \leq 200$.

In the exemplary embodiment of the present application, a ratio of m and n may be 1:9 to 7:3. That is, in the case where m+n is 1, n may have a ratio of 0.3 to 0.9.

In the exemplary embodiment of the present application, the ratio of m and n may be 2:8 to 6:4. That is, in the case where m+n is 1, n may have a ratio of 0.4 to 0.8.

In the exemplary embodiment of the present application, at least one of $X_1$ to $X_3$ may be represented by the following Chemical Formula 11.

[Chemical Formula 11]

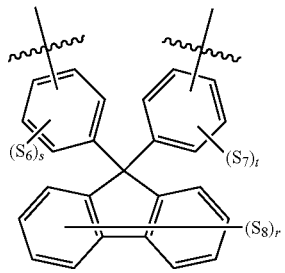

In Chemical Formula 11, $S_6$ to $S_8$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, s and t are the same as or different from each other, and are each independently an integer of 0 or more and 4 or less, and r may be an integer of 0 or more and 8 or less.

In the exemplary embodiment of the present application, at least one of $X_1$ and $X_2$ may be represented by Chemical Formula 11.

In the exemplary embodiment of the present application, Chemical Formula 1 may be represented by the following Chemical Formula 1-1.

[Chemical Formula 1-1]

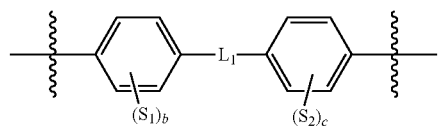

In Chemical Formula 1-1, $S_1$, $S_2$, b, c, and $L_1$ are the same as those defined in Chemical Formula 1.

In the exemplary embodiment of the present application, Chemical Formula 4 may be represented by the following Chemical Formula 4-1.

[Chemical Formula 4-1]

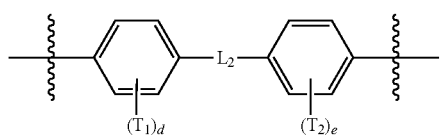

In Chemical Formula 4-1, $T_1$, $T_2$, d, e, and $L_2$ are the same as those defined in Chemical Formula 4.

According to the exemplary embodiment of the present application, in Chemical Formulas A and B, $X_1$, $X_2$, and $X_3$ may be the same as or different from each other, and may be each independently any one selected from the following Structural Formulas.

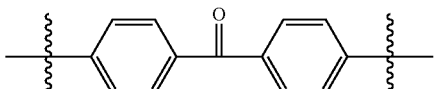

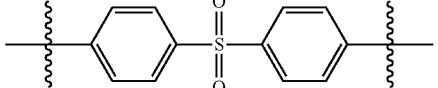

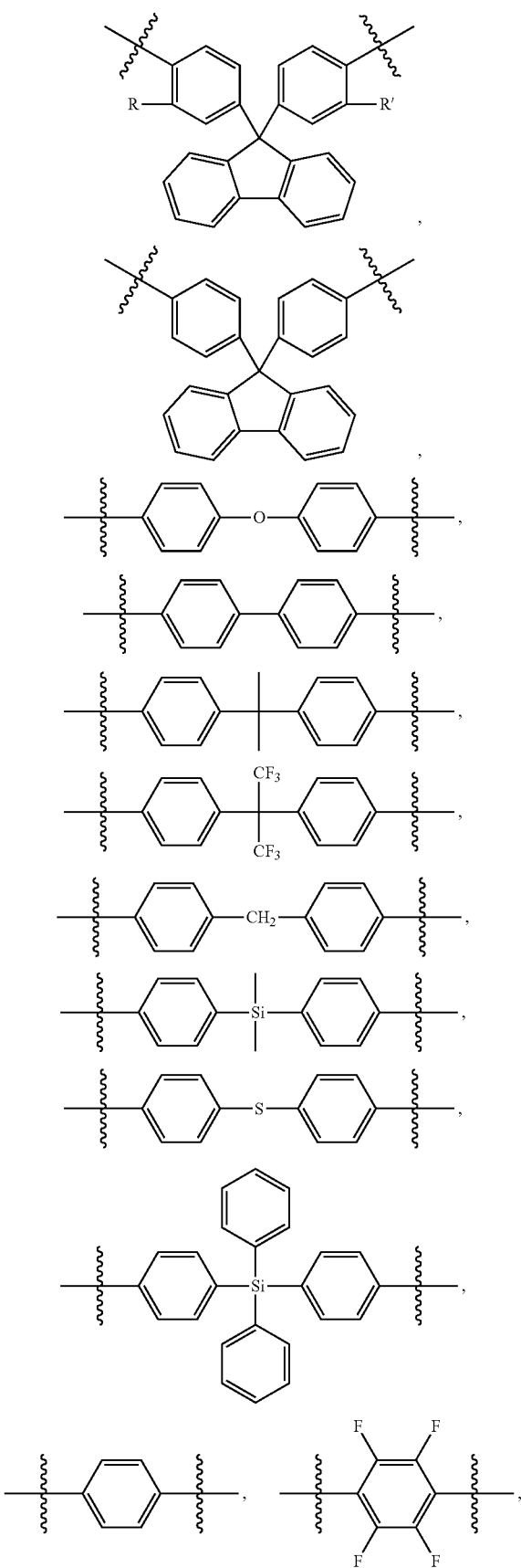

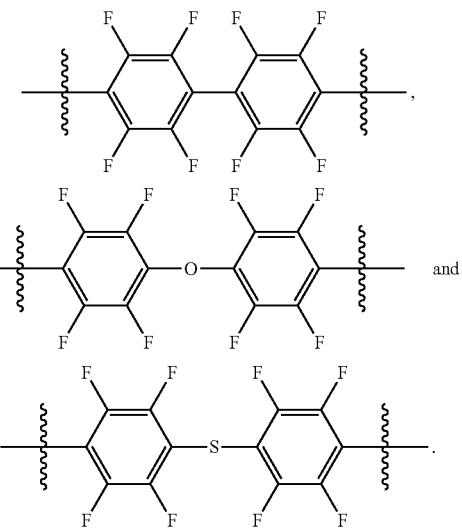

Herein, R and R' are the same as or different from each other, and are each independently —NO$_2$ or —CF$_3$.

According to the exemplary embodiment of the present application, in Chemical Formulas A and B, at least one of X$_1$, X$_2$, and X$_3$ may be

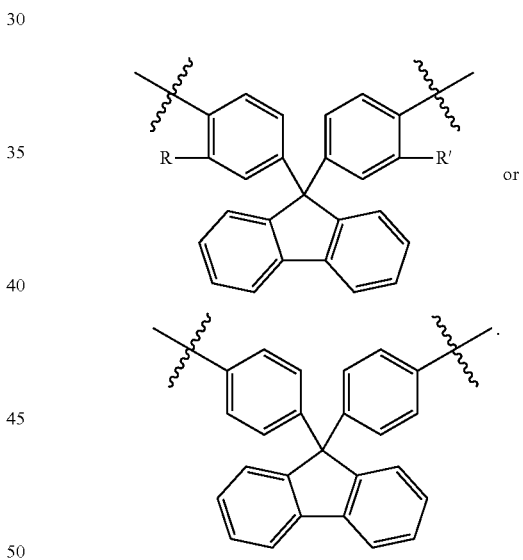

Herein, R and R' are the same as or different from each other, and are each independently —NO$_2$ or —CF$_3$.

According to the exemplary embodiment of the present application, in Chemical Formula B, Y$_1$ may be any one selected from the following Structural Formulas.

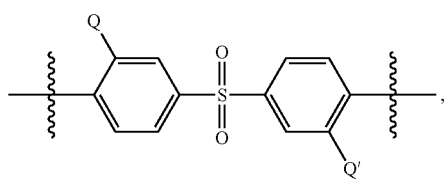

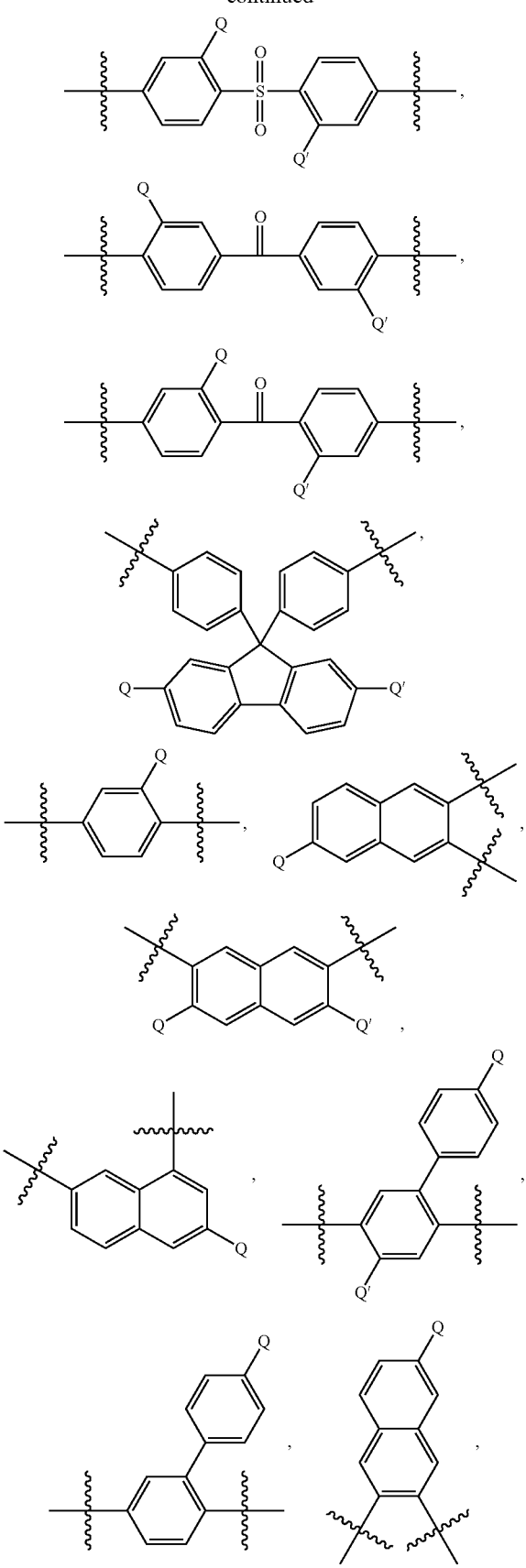

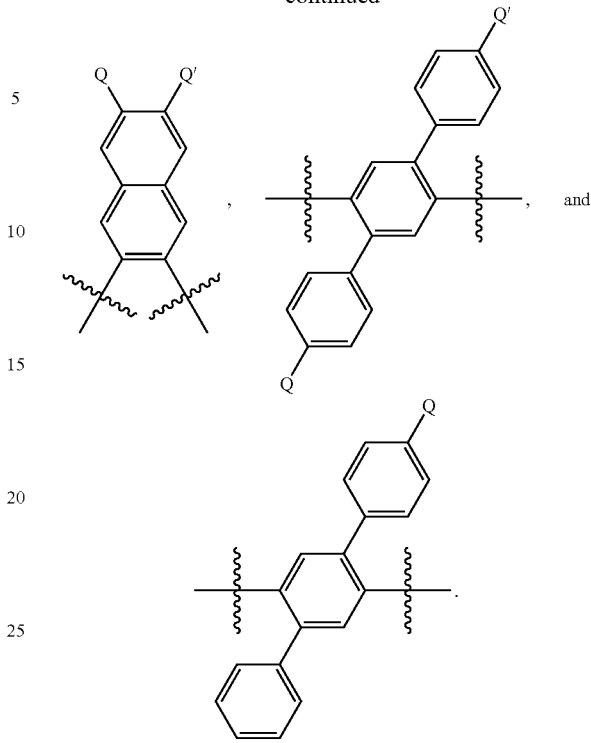

Herein, Q is —SO₃Li, —COOLi, or —OLi, and Q' is hydrogen, —SO₃Li, —COOLi, or —OLi.

In the exemplary embodiment of the present application, Q may be —SO₃Li.

In the exemplary embodiment of the present application, Q' may be —SO₃Li.

In the exemplary embodiment of the present application, the copolymer may further include a repeating unit of the following Chemical Formula C.

[Chemical Formula C]

According to the exemplary embodiment of the present application, in Chemical Formula C, Z is a trivalent organic group.

In the exemplary embodiment of the present application, the repeating unit of Chemical Formula C is a brancher, and serves to connect or cross-link polymer chains. A branch may be formed in the chains or the chains may be cross-linked with each other to form a net-shaped structure according to the number of repeating units of Chemical Formula C.

In the exemplary embodiment of the present application, in Chemical Formula C, Z is a trivalent organic group and may be bonded to the additional repeating units in three directions to stretch the polymer chains.

In the exemplary embodiment of the present application, mechanical properties may be reinforced by using the brancher that is the repeating unit of Chemical Formula C.

In the exemplary embodiment of the present application, when the number of repeating units of Chemical Formula C is r, r may be an integer of 1 to 300.

In the exemplary embodiment of the present application, the repeating unit of Chemical Formula C may be a polymer repeating unit constituting a main chain. For example, Z may be connected to at least one selected from $X_1$, $X_2$, $X_3$, and $Y_1$ to form one repeating unit. One repeating unit formed as described above may form the main chain. In this case, the number of repeating units is the same as the aforementioned k.

In the present specification, when two or more selected from Z, $X_1$, $X_2$, $X_3$, and $Y_1$ are bonded, each thereof has a connection group of oxygen (—O—). The connection group of oxygen is a connection group that remains in the chain after the compound evades therefrom by a condensation polymerization. For example, when a dihalogen-based monomer and a diol-based monomer are polymerized, there may be a case where HF evades and only oxygen (—O—) remains in the chain.

According to the exemplary embodiment of the present application, in Chemical Formula C, Z is represented by the following Chemical Formula C-1 or C-2.

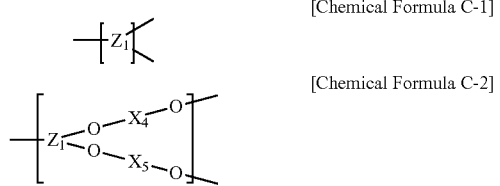

[Chemical Formula C-1]

[Chemical Formula C-2]

In Chemical Formulas C-1 and C-2, $Z_1$ may be represented by any one of the following Chemical Formulas 7 to 9.

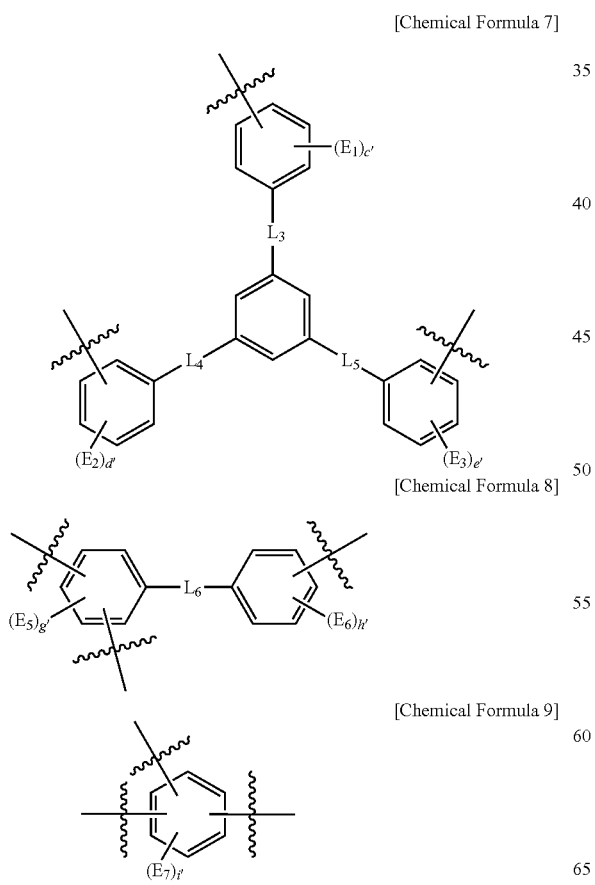

[Chemical Formula 7]

[Chemical Formula 8]

[Chemical Formula 9]

In Chemical Formulas 7 to 9, $L_3$ to $L_6$ are the same as or different from each other, and are each independently a direct connection, —O—, —CO—, or —SO$_2$—, $E_1$ to $E_7$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, c', d', e', and h' are the same as or different from each other, and are each independently an integer of 0 or more and 4 or less, f', g', and i' are the same as or different from each other, and are each independently an integer of 0 or more and 3 or less, and $X_4$ and $X_5$ are each independently the same as a definition of $X_3$ or $Y_1$ of Chemical Formula B.

According to the exemplary embodiment of the present application, in Chemical Formula C, Z may be any one selected from the following Structural Formulas.

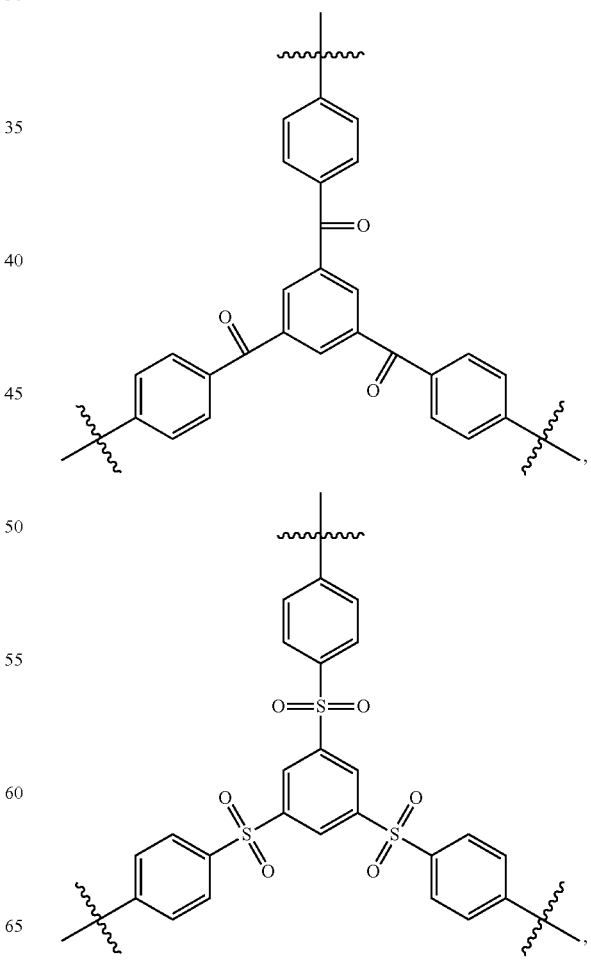

-continued

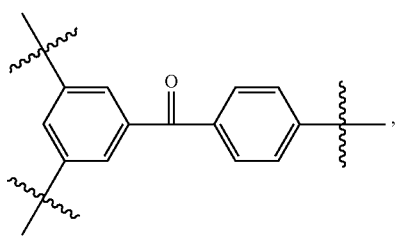

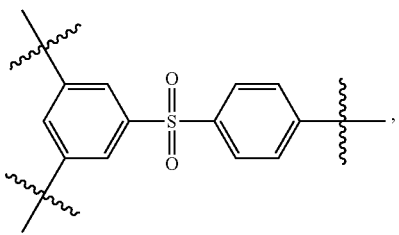

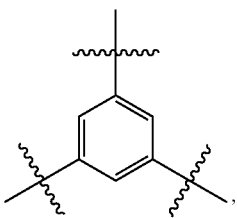, 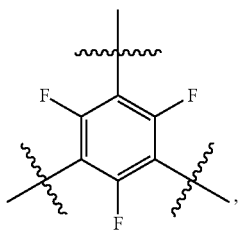,

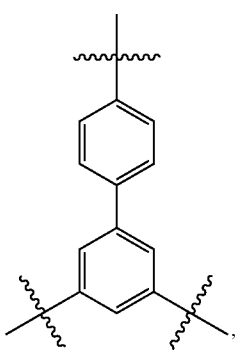, 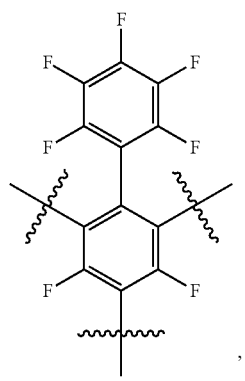,

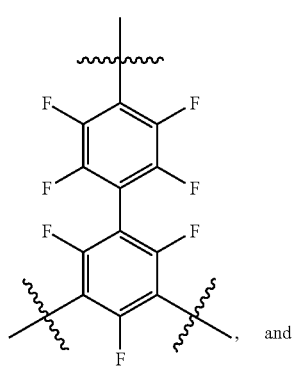, and

-continued

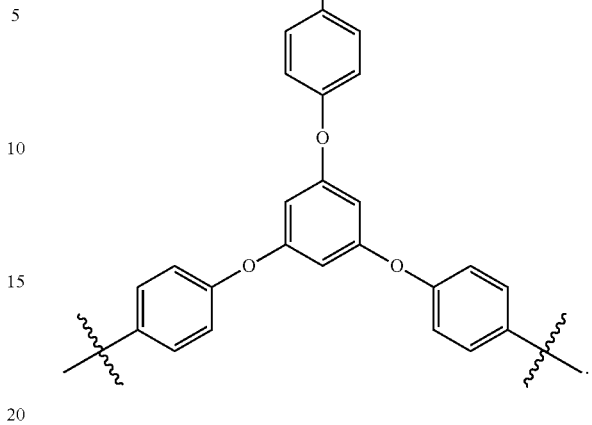

In the exemplary embodiment of the present application, the repeating unit of Chemical Formula A may be represented by the following Structural Formula.

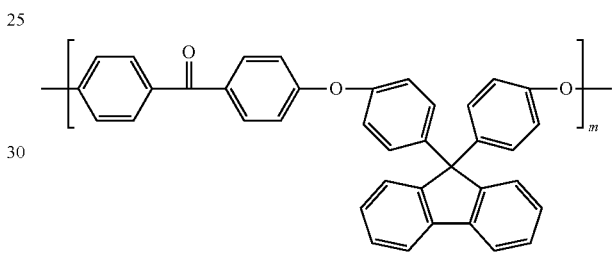

In the Structural Formula, m is the same as the aforementioned matter.

In the exemplary embodiment of the present application, the repeating unit of Chemical Formula B may be represented by the following Structural Formula.

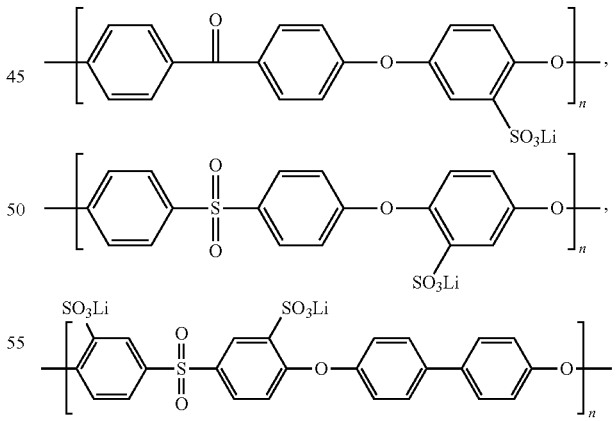

In the Structural Formulas, n is the same as the aforementioned matter.

According to the exemplary embodiment of the present application, a weight average molecular weight of the copolymer may be 500 or more and 5,000,000 or less, specifically 10,000 or more and 2,000,000 or less, and more specifically 20,000 or more and 1,000,000 or less. When the weight average molecular weight of the copolymer is in the aforementioned range, mechanical properties of an electrolyte membrane may not be reduced, and preparing of the electrolyte membrane may be facilitated by maintaining appropriate solubility of the copolymer.

According to the exemplary embodiment of the present application, the binder may connect the inorganic oxide particles, and pores may be formed in the second layer due to at least one interstitial volume selected from an interstitial volume between the inorganic oxide particles and the binder; and an interstitial volume between the inorganic oxide particles.

According to the exemplary embodiment of the present application, the second layer may have a pore size of 0.01 micrometer or more and 50 micrometers or less and a porosity of 5% or more and 95% or less.

In the present specification, the pore size means a diameter of the pore.

According to the exemplary embodiment of the present application, the inorganic oxide particle should be electrochemically stable and may be a particle where oxidation and/or reduction reactions do not occur in an operation voltage range (for example, 0 to 5 V based on $Li/Li^+$) of the lithium-sulfur battery. Further, in the case where the inorganic oxide particle has a high density, there is difficulty in dispersion during coating and besides there is a problem in that a weight is increased when the battery is prepared, and thus it is preferable that the density be as low as possible.

According to the exemplary embodiment of the present application, the inorganic oxide particle may be one or more selected from a group consisting of a hydrophilic inorganic oxide particle and an inorganic oxide particle having a lithium ion transporting ability.

According to the exemplary embodiment of the present application, the hydrophilic inorganic oxide particle may contribute to an increase in dissociation of an electrolyte salt in a liquid electrolyte, for example, a lithium salt, only when permittivity is high, and thus improve ion conductivity of an electrolytic solution. Specifically, a high permittivity inorganic oxide particle having a permittivity constant of 5 or more and preferably 10 or more is preferable. The hydrophilic inorganic oxide particle may include, more specifically, one or two or more selected from a group consisting of $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, $BaTiO_3$, $HfO_2$, $Pb(Zr,Ti)O_3$ (PZT), $Pb_{1-x}La_xZr_{1-y}Ti_yO_3$ (PLZT) ($0<x<1$, $0<y<1$), and $PB(Mg_3Nb_{2/3})O_3$—$PbTiO_3$ (PMN-PT).

According to the exemplary embodiment of the present application, the inorganic oxide particle having the lithium ion transporting ability means an inorganic oxide particle containing a lithium element, not storing lithium therein, and having a function of moving lithium ions. Since the inorganic oxide particle having the lithium ion transporting ability can transport and move the lithium ions due to a kind of defect existing in a particle structure, lithium ion conductivity in the battery may be improved, and thus improvement of performance of the battery may be promoted. Accordingly, it is preferable that ion conductivity of the inorganic oxide particle having the lithium ion transporting ability be as high as possible. Specific examples thereof may include one or two or more selected from a group consisting of lithium phosphate ($Li_3PO_4$), lithium titanium phosphate ($Li_xTi_y(PO_4)_3$, $0<x<2$, $0<y<1$, $0<z<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) and lithium lanthanum titanate ($Li_xLa_yTiO_3$, $0<x<2$, $0<y<3$).

According to the exemplary embodiment of the present application, the size of the inorganic oxide particle may be 0.001 micrometer or more and 10 micrometers or less. The size in the aforementioned range may enable the second layer having the uniform thickness to be formed and besides enable appropriate porosity to be formed. Further, only when the size is 0.001 micrometer or more, since dispersibility is not reduced, it is easy to adjust physical properties of the second layer, and only when the size is 10 micrometers or less, an increase on thickness of the second layer may be prevented to prevent a reduction in mechanical property and prevent excessive enlargement of the pore and thus prevent occurrence of an internal short-circuit during charging and discharging of the battery.

In the present specification, the size of the inorganic oxide particle means a diameter of the inorganic oxide particle.

According to the exemplary embodiment of the present application, a pore structure of the second layer may be formed and adjusted by adjusting the size and the content of the inorganic oxide particle that is a constitutional component and compositions of the inorganic oxide particle and the binder. The pore structure is filled with an injected liquid electrolyte, and thus there is an effect that interface resistance between the inorganic oxide particles or between the inorganic oxide particle and the binder is reduced.

According to the exemplary embodiment of the present application, the content of the inorganic oxide particle may be 5 wt % or more and 99 wt % or less and more specifically 50 wt % or more and 99 wt % or less based on the total weight of the mixture including the inorganic oxide particle and the binder. In the case where the content of the inorganic oxide particle is less than 5 wt %, since the content of the binder becomes excessively high, the pore size and the porosity may be reduced due to a reduction in interstitial volume formed between the inorganic oxide particles, and thus performance of the final battery may be reduced. Further, in the case where the content of the inorganic oxide particle is more than 99 wt %, since the content of the polymer is excessively low, mechanical properties of a final organic/inorganic complex porous coating layer may be reduced due to weakening of attachment force between inorganic materials.

According to the exemplary embodiment of the present application, a general binder polymer in the art may be used as long as the binder may faithfully serve to connect and stably fix inorganic material particles to contribute to preventing a reduction in mechanical property of the finally prepared second layer.

According to the exemplary embodiment of the present application, the binder does not need to essentially have an ion conducting ability, but in the case where the polymer having the ion conducting ability is used, performance of an electrochemical device may be further improved. Accordingly, it is preferable that the permittivity constant of the binder polymer be as high as possible. Actually, since dissociation of the salt in the electrolytic solution depends on the permittivity constant of a solvent of the electrolytic solution, as the permittivity constant of the polymer is increased, dissociation of the salt in the electrolyte of the present invention may be improved. The polymer having the permittivity constant in the range of 1.0 to 100 (measured frequency=1 kHz) can be used, and particularly, it is preferable that the permittivity constant be 10 or more.

According to the exemplary embodiment of the present application, in addition to the aforementioned function, the binder of the present invention may be gelled during electrolytic solution incorporation to exhibit the high degree of incorporation in the electrolytic solution. Accordingly, the polymer having the solubility parameter of 15 $Mpa^{1/2}$ or more and 45 Mpa$^{1/2}$ or less is preferable, and more preferably, the solubility parameter is in the range of 15 Mpa$^{1/2}$ or more, 25 Mpa$^{1/2}$ or less, 30 Mpa$^{1/2}$ or more, and 45 Mpa$^{1/2}$ or less. Accordingly, hydrophilic polymers having many polar groups are more preferable than hydrophobic polymers such as polyolefines. This is because in the case where the solubility parameter deviates from the range of 15 Mpa$^{1/2}$ or more and 45 Mpa$^{1/2}$ or less, it is difficult to perform incorporation by a general electrolytic solution for a battery. Herein, the solubility parameter is an intrinsic value of the polymer, which exhibits whether the solvent easily permeates between the polymer chains. If the solubility parameter is low, since it is difficult for the solvent to permeate, it is difficult for the polymer to be gelled, and if the solubility parameter is high, the high solubility parameter means that the polymer is easily dissolved. A unit of MPa$^{1/2}$ is an SI unit, and generally, a unit of (cal/cm$^3$)$^{1/2}$ is used.

According to the exemplary embodiment of the present application, the binder may specifically include one or a mixture of two or more selected from a group consisting of polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxylmethyl cellulose, acrylonitrile-co-styrenebutadiene, and polyimide.

According to the exemplary embodiment of the present application, the second layer may further include a general additive known in the art in addition to the inorganic oxide particle and the binder.

According to the exemplary embodiment of the present application, thicknesses of the first layer and the second layer may be each specifically 1 micrometer or more and 100 micrometers or less, and more specifically 1 micrometer or more and 30 micrometers or less. In views of a reduction in internal resistance of the battery, the thickness is preferably in the range of 1 micrometer or more and 100 micrometers or less, and more preferably in the range of 1 micrometer or more and 30 micrometers or less.

According to the exemplary embodiment of the present application, the porous base material may include one or a mixture of two or more selected from a group consisting of high density polyethylene, low density polyethylene, linear low density polyethylene, ultrahigh molecular weight polyethylene, polypropyleneterephthalate, polyethyleneterephthalate, polybutyleneterephthalate, polyester, polyacetal, polyamide, polycarbonate, polyimide, polyetheretherketone, polyethersulfone, polyphenylene oxide, polyphenylene sulfide, and polyethylenenaphthalene.

According to the exemplary embodiment of the present application, the porous base material may have the pore size of 0.01 micrometer or more and 50 micrometers or less and the porosity of 5% or more and 95% or less. Only when the pore size is 0.01 micrometer or more and the porosity is 5% or more, the porous base material may be prevented from serving as a resistance layer. Further, only when the pore size is 50 micrometers or less and the porosity is 95% or less, mechanical properties may be maintained.

According to the exemplary embodiment of the present application, the thickness of the third layer may be 1 micrometer or more and 100 micrometers or less, and more specifically 1 micrometer or more and 100 micrometers or less. Only when the thickness is 1 micrometer or more, the third layer may be prevented from serving as a resistance layer, and only when the thickness is 100 micrometers or less, mechanical properties may be maintained.

The exemplary embodiment of the present application provides a method for preparing the separation membrane including: forming a first layer including a lithium ion conductive compound having one or more functional groups selected from —SO$_3$Li, —COOLi, and —OLi; and forming a second layer including an inorganic oxide particle and a binder on the first layer.

In the exemplary embodiment of the present application, the preparing method may further include forming a third layer including a porous base material provided between the first layer and the second layer.

In the exemplary embodiment of the present application, in the forming of the third layer, the third layer including the porous base material may be prepared and the first layer or the second layer may be formed on the third layer.

For example, the lithium ion conductive compound having one or more functional groups selected from —SO$_3$Li, —COOLi, and —OLi may be applied on the third layer including the porous base material.

According to the exemplary embodiment of the present application, after the first layer or the second layer is formed on the porous base material, a first layer composition or a second layer composition is incorporated in a pore of the porous base material, and thus the porosity of the porous base material may be 5% or less.

According to the preparing method of the exemplary embodiment of the present application, the first layer may be formed by dissolving the lithium ion conductive compound in an organic solvent to form the first layer composition and then drying the first layer composition. Thereafter, after the binder is dissolved in the organic solvent, the second layer composition may be formed by adding and dispersing the inorganic oxide particles, and then may be formed on the first layer. In this case, a coating method may be used as a forming method, or the second layer composition may be dried to form the second layer, and the second layer may be then laminated on the first layer.

According to the preparing method of the exemplary embodiment of the present application, after the binder is dissolved in the organic solvent, the second layer composition may be formed by adding and dispersing the inorganic oxide particles, and then may be dried to form the second layer. Thereafter, after the lithium ion conductive compound is dissolved in the organic solvent to form the first layer composition, the first layer may be formed. In this case, a coating method may be used as the forming method, or the first layer composition may be dried to form the first layer and the first layer may be then laminated on the second layer.

According to the preparing method of the exemplary embodiment of the present application, the first layer composition may be applied on one surface of the third layer including the porous base material and dried, and the second layer composition may be applied on the other surface of the third layer and dried to prepare the separation membrane.

According to the exemplary embodiment of the present application, a general method known in the art may be used as the applying or coating method, and specifically, dip coating, die coating, roll coating, comma coating, or a mixing method thereof may be used.

According to the exemplary embodiment of the present application, it is preferable that the organic solvent used when the first layer composition and the second layer composition are formed have a solubility parameter that is similar to that of a polymer to be used and a boiling point thereof be low. This is because mixing can be uniformly performed and the solvent can be then easily removed. Specific examples thereof may include acetone, tetrahydrofuran, methylene chloride, chloroform, dimethylformamide, N-methyl-2-pyrrolidone (NMP), cyclohexane, water, or a mixture thereof.

The exemplary embodiment of the present application provides a lithium-sulfur battery including a cathode; an anode; and the separation membrane positioned between the cathode and the anode, in which a first layer of the separation membrane is provided to be closer to the cathode and a second layer of the separation membrane is provided to be closer to the anode.

According to the exemplary embodiment of the present application, the first layer of the separation membrane may be provided to come into contact with the cathode, and the second layer of the separation membrane may be provided to come into contact with the anode.

The lithium-sulfur battery may further include an electrolyte incorporated in the cathode, the anode, and/or the separation membrane. The electrolyte may include a lithium salt and an organic solvent.

The exemplary embodiment of the present application provides a method for preparing a lithium-sulfur battery including: assembling the separation membrane, a cathode, and an anode, in which the assembling is performed so that a first layer of the separation membrane is closer to the cathode and a second layer of the separation membrane is closer to the anode.

According to the exemplary embodiment of the present application, the assembling may be performed so that the first layer of the separation membrane comes into contact with the cathode and the second layer of the separation membrane comes into contact with the anode.

According to the exemplary embodiment of the present application, the method may further include forming the separation membrane before the assembling.

A description relating to the separation membrane in the lithium-sulfur battery is the same as the aforementioned description.

According to the exemplary embodiment of the present application, the cathode includes a sulfur-carbon complex as a cathode active material.

According to the exemplary embodiment of the present application, the cathode may further include, in addition to the cathode active material, one or more additives selected from a transition metal element, a Group IIIA element, a Group IVA element, a sulfur compound of the elements, and an alloy of the elements and sulfur.

According to the exemplary embodiment of the present application, examples of the transition metal element may include Sc, Ti, V, Cr, Mn, Fe, Co, Ni, Cu, Zn, Y, Zr, Nb, Mo, Tc, Ru, Rh, Pd, Os, Ir, Pt, Au, Hg, or the like, examples of the Group IIIA element may include Al, Ga, In, Ti, or the like, and examples of the Group IVA element may include Ge, Sn, Pb, or the like.

According to the exemplary embodiment of the present application, the cathode may further include an electric conductive material for allowing electrons to smoothly move in the cathode and a binder for well attaching the cathode active material to a current collector, together with the cathode active material or selectively the additive.

According to the exemplary embodiment of the present application, the conductive material is not particularly limited as long as the conductive material has conductivity while not causing a chemical change in the battery, but a graphite-based material such as KS6; carbon black such as Super-P, Denka black, acetylene black, Ketjen black, channel black, furnace black, lamp black, summer black, and carbon black; a carbon derivative such as a carbon nanotube or fullerene; conductive fibers such as carbon fibers or metal fibers; a metal powder such as carbon fluoride, aluminum, or nickel powder; or a conductive polymer such as polyaniline, polythiophene, polyacetylene, and polypyrrole may be used alone or used while being mixed.

According to the exemplary embodiment of the present application, the conductive material may be added in the content of 0.01 wt % to 30 wt % based on the total weight of the mixture including the cathode active material.

According to the exemplary embodiment of the present application, as the binder, poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoropropylene and polyvinylidene fluoride (trade name: Kynar), poly(ethyl acrylate), polytetrafluoroethylenepolyvinyl chloride, polyacrylonitrile, polyvinylpyridine, polystyrene, a derivative, a blend, and a copolymer thereof, and the like may be used.

According to the exemplary embodiment of the present application, the binder may be added in the content of 0.5 wt % to 30 wt % based on the total weight of the mixture including the cathode active material. If the content of the binder is less than 0.5 wt %, physical properties of the cathode may be reduced to cause deintercalation of the active material and the conductive material in the cathode, and if the content is more than 30 wt %, a ratio of the active material and the conductive material in the cathode may be relatively reduced to reduce a battery capacity.

Specifically reviewing the method for preparing the cathode of the present application in the exemplary embodiment of the present application, first, the binder is dissolved in a solvent for preparing a slurry, and the conductive material is then dispersed. As the solvent for preparing the slurry, it is preferable to use a solvent that can uniformly disperse the cathode active material, the binder, and the conductive material and is easily vaporized, and representatively, acetonitrile, methanol, ethanol, tetrahydrofuran, water, isopropyl alcohol, and the like may be used. Next, the cathode active material, or selectively, together with the additive, is uniformly dispersed again in the solvent where the conductive material is dispersed to prepare a cathode slurry. The amount of the solvent, the cathode active material, or selectively, the additive included in the slurry does not have a particularly important meaning in the present application, but the amount is sufficient as long as an appropriate viscosity is secured so as to easily apply the slurry.

The prepared slurry is applied on the current collector, and dried under the vacuum to form the cathode. The slurry may be applied in an appropriate thickness on the current collector according to the viscosity of the slurry and the thickness of the cathode to be formed.

According to the exemplary embodiment of the present application, the current collector is not particularly limited as long as the current collector can be generally formed in a thickness of 3 micrometers to 500 micrometers, does not cause a chemical change in the battery, and has high conductivity. Specifically, a conductive material such as stainless steel, aluminum, copper, and titanium may be used, and more specifically a carbon-coated aluminum current collector may be used. The use of the carbon-coated aluminum substrate has merits in that adhesion strength to the active material is excellent, contact resistance is low, and corrosion of aluminum by polysulfide is prevented, as compared to a substrate not coated with a carbon. The current collector can be formed in various types such as a film, a sheet, a foil, a net, a porous body, a foaming body, or a non-woven fabric body.

According to the exemplary embodiment of the present application, in the anode, as the anode active material, a material that can reversibly perform intercalation or deintercalation of lithium ions, a material that can react with the lithium ions to reversibly form a lithium-containing compound, a lithium metal, or a lithium alloy may be used.

According to the exemplary embodiment of the present application, the material that can reversibly perform intercalation or deintercalation of the lithium ions may be, for example, crystalline carbon, amorphous carbon, or a mixture thereof.

According to the exemplary embodiment of the present application, the material that can react with the lithium ions to reversibly form the lithium-containing compound may be, for example, tin oxide, titanium nitrate, or silicon.

According to the exemplary embodiment of the present application, the lithium alloy may be, for example, an alloy of lithium and a metal selected from a group consisting of Na, K, Rb, Cs, Fr, Be, Mg, Ca, Sr, Ba, Ra, Al, and Sn.

According to the exemplary embodiment of the present application, the electrolyte incorporated in the anode, the cathode, and/or the separation membrane includes the lithium salt and the organic solvent.

According to the exemplary embodiment of the present application, a concentration of the lithium salt may be 0.2 M to 2 M, specifically 0.6 M to 2 M, and more specifically 0.7 M to 1.7 M according to various factors such as a precise composition of an electrolyte solvent mixture, solubility of the salt, conductivity of the dissolved salt, a charging and discharging condition of the battery, an operation temperature, and other factors publicly known in a lithium battery field. If the lithium salt is used at the concentration of less than 0.2 M, conductivity of the electrolyte may be reduced to reduce performance of the electrolyte, and if the lithium salt is used at the concentration of more than 2 M, the viscosity of the electrolyte may be increased to reduce mobility of the lithium ions. Examples of the lithium salt to be used in the present application may include one or more selected from a group consisting of LiSCN, LiBr, LiI, LiPF$_6$, LiBF$_4$, LiSO$_3$CF$_3$, LiClO$_4$, LiSO$_3$CH$_3$, LiB(Ph)$_4$, LiC(SO$_2$CF$_3$)$_3$, and LiN(SO$_2$CF$_3$)$_2$.

According to the exemplary embodiment of the present application, a single solvent may be used or a mixture organic solvent of two or more thereof may be used as the organic solvent. In the case where the mixture organic solvent of two or more thereof is used, it is preferable to select and use one or more solvents from two or more groups of a weak polar solvent group, a strong polar solvent group, and a lithium metal protection solvent group.

According to the exemplary embodiment of the present application, the weak polar solvent is defined as a solvent that can dissolve a sulfur element among an aryl compound, bicyclic ether, and non-cyclic carbonate and has a dielectric constant of less than 15, the strong polar solvent is defined as a solvent that can dissolve lithium polysulfide among bicyclic carbonate, a sulfoxide compound, a lactone compound, a ketone compound, an ester compound, a sulfate compound, and a sulfite compound and has a dielectric constant of more than 15, and the lithium metal protection solvent is defined as a solvent that forms a stable SEI (solid electrolyte interface) on the lithium metal, such as a saturated ether compound, an unsaturated ether compound, and a hetero-cyclic compound including N, O, S, or a combination thereof and has charging and discharging cycle efficiency of 50% or more.

According to the exemplary embodiment of the present application, specific examples of the weak polar solvent include xylene, dimethoxyethane, 2-methyltetrahydrofuran, diethyl carbonate, dimethyl carbonate, toluene, dimethyl ether, diethyl ether, diglyme, tetraglyme, or the like.

According to the exemplary embodiment of the present application, specific examples of the strong polar solvent include hexamethyl phosphoric triamide, γ-butyrolactone, acetonitrile, ethylene carbonate, propylene carbonate, N-methylpyrrolidone, 3-methyl-2-oxazolidone, dimethyl formamide, sulforane, dimethyl acetamide, dimethyl sulfoxide, dimethyl sulfate, ethylene glycol diacetate, dimethyl sulfite, ethylene glycol sulfite, or the like.

According to the exemplary embodiment of the present application, specific examples of the lithium protection solvent include tetrahydrofuran, ethylene oxide, dioxolane, 3,5-dimethyl isoxazol, furan, 2-methyl furan, 1,4-oxane, 4-methyldioxolane, or the like.

According to the exemplary embodiment of the present application, the electrolyte may be applied in an appropriate step of a process for preparing an electrochemical device according to a preparing process and required physical properties of a final product. That is, the electrolyte may be applied before assembling of the electrochemical device or in a final step of assembling of the electrochemical device.

Another exemplary embodiment of the present application provides a battery module including the lithium-sulfur battery as a unit battery.

According to the exemplary embodiment of the present application, the battery module may be specifically used as a power source of an electric vehicle, a hybrid electric vehicle, a plug-in hybrid electric vehicle, or an electric power storage system.

Hereinafter, the present application will be described in detail with reference to Examples and Comparative Examples. However, the Examples according to the present application may be modified in various other forms, and the scope of the present application is not interpreted below to be limited to the Examples. The Examples of the present application are provided to more fully describe the present application to the person with ordinary skill in the art.

PREPARATION EXAMPLE 1

Preparation of Polyaryleneether Copolymer Containing Sulfonic Acid Lithium (Preparation of Brancher)

5 g (18.8 mmol) of 1,3,5-benzenetricarbonyl trichloride, 6.7 g (50.0 mmol) of aluminum chloride, and 50 mL of distilled dichloromethane (DCM) were added to the 250 mL round flask, and then agitated under nitrogen at the temperature of 25° C. for 30 minutes to be reacted. Next, 20 mL of dichloromethane and 4.5 g (48.8 mmol) of fluorobenzene were added to the 100 mL dropping funnel, and the fluorobenzene solution was applied in drops to the reactant of the round flask. After the reactant was agitated under the nitrogen atmosphere for 4 hours, 20 mL of distilled water was added thereto, and the reactant was further agitated again for 12 hours or more. After the organic layer was extracted from the reactant by using dichloromethane, the crude product obtained by removing the organic solvent was recrystallized by ethanol to separate [3,5-bis(4-fluorobenzoyl)phenyl](4-fluorophenyl)methanone that was the white brancher (yield: 70%). The structure of [3,5-bis(4-fluorobenzoyl)phenyl](4-fluorophenyl)methanone was confirmed by using $^1$H-NMR, $^{13}$C-NMR spectroscopy, elementary analysis, or the like. $^1$H-NMR (DMSO-d6): δ(ppm) 8.24 (s, 3H), 7.96(m, 6H), 7.46(m, 6H)

(Preparation of Branched Hydrophobic Block)

After the dean-stark apparatus was connected to the 500 mL round flask, 17.238 g (79.00 mmol) of 4,4'-difluorobenzophenone, 1.053 g (2.37 mmol) of [3,5-bis(4-fluorobenzoyl)phenyl](4-fluorophenyl)methanone, 24.502 g (69.92 mmol) of 9,9-bis(4-hydroxyphenyl)fluorene, 19.327 g (139.84 mmol) of potassium carbonate, 200 mL of N-methyl-2-pyrrolidone, and 120 mL of benzene were added. Next, after reaction mixture was agitated under nitrogen at the temperature of 140° C. in the oil bath for 4 hours to completely remove the azeotrope adsorbed onto the molecular sieves of the dean-stark apparatus by backward flowing of benzene by pressurized nitrogen, the reaction temperature was increased to 182° C. and 100 mL of N-methyl-2-pyrrolidone was further added to perform the condensation polymerization reaction for 12 hours. After the reaction was finished, the temperature of the reactant was reduced to 60° C., and about 200 mL of N-methyl-2-pyrrolidone in the reactant was removed while the vacuum is applied and simultaneously the temperature of the reactant was increased to 120° C. Next, after the temperature of the reactant was reduced to room temperature and 300 mL of methyltetrahydrofuran (THF) was added to dilute the reactant, the diluted reactant was poured on 3 L of methanol to separate the copolymer from the solvent, and the copolymer (cake form) obtained by filtering was dried in the vacuum oven at 80° C. for 12 hours or more to prepare 34.8 g of the white branched hydrophobic block having the weight average molecular weight of 5,000 g/mol and the end group characterized by fluorine elements.

(Preparation of Polyaryleneether Copolymer Containing Sulfonic Acid Lithium)

13.082 g (2.616 mmol) of the branched hydrophobic block prepared as described above, 10.162 g (46.572 mmol) of 4,4'-difluorobenzophenone, 0.93 g (2.093 mmol) of [3,5-bis(4-fluorobenzoyl)phenyl](4-fluorophenyl)methanone, 11.945 g (52.328 mmol) of the hydroquinonesulfonic acid lithium salt, 14.463 g (104.650 mmol) of potassium carbonate, 200 mL of dimethyl sulfoxide, and 120 mL of benzene were added. Next, after the reaction mixture was agitated under nitrogen at the temperature of 140° C. in the oil bath for 4 hours to completely remove the azeotrope adsorbed onto the molecular sieves of the dean-stark apparatus by backward flowing of benzene by pressurized nitrogen, the reaction temperature was increased to 182° C. and 100 mL of dimethyl sulfoxide was further added to perform the condensation polymerization reaction for 12 hours. After the reaction was finished, 200 mL of dimethyl sulfoxide was added to the reactant to dilute the reactant, the diluted reactant was poured on 3 L of methanol to separate the copolymer from the solvent, and the copolymer (cake form) obtained by filtering was dried in the vacuum oven at 80° C. for 12 hours or more to prepare the polyaryleneether copolymer containing sulfonic acid lithium, in which the branched hydrophobic block and the branched hydrophilic block were alternately bonded by the chemical bond. The weight average molecular weight of the copolymer was about 800,000.

The confirmation result of synthesis of the copolymer prepared according to Preparation Example 1 is illustrated in the following FIG. 1. FIG. 1 is a $^1$H NMR measurement graph of the copolymer prepared according to Preparation Example 1. According to FIG. 1, it could be confirmed that the polyaryleneether copolymer containing sulfonic acid lithium was synthesized. The structure of the polyaryleneether copolymer containing sulfonic acid lithium is schematically illustrated in FIG. 1, and the values of the repeating units n and m are the same as the aforementioned values.

EXAMPLE 1

Conductive carbon having electric conductivity and sulfur were mixed at the weight ratio (wt %) of conductive carbon:sulfur of 30:70 (21 g:49 g) through the ball mill process to obtain the sulfur-carbon complex. Based on the total weight of the positive electrode active material slurry, the positive electrode active material slurry having the compositions of 70.0 g of the positive electrode active material including the complex, 20.0 g of Super-P as the conductive material, 10.0 g of polyvinylidene fluoride as the binder, and 500 g of N-methyl-2-pyrrolidone as the solvent was prepared, and then applied on the aluminum current collector to prepare the positive electrode active portion.

On one lateral surface of the 16 μm polypropylene base material, the polyaryleneether copolymer containing sulfonic acid lithium dispersed in DMSO (dimethyl sulfoxide) was applied in the thickness of 1 μm, and on the other lateral surface of the base material, aluminum oxide having the diameter of 400 nm and the PVDF-HFP (polyvinylidene fluoride hexafluoropropylene) copolymer dispersed in acetone were applied in the thickness of 5 μm to prepare the separation membrane. In this case, the polypropylene base material having the porosity of 50% was used, and the porosity of the prepared separation membrane was 0.5%.

The lithium foil having the thickness of about 150 μm was used as the negative electrode together with the positive electrode, the mixture solution of dimethoxyethane:dioxolane (volume ratio of 1:1), in which LiN(CF$_3$SO$_2$)$_2$ was dissolved at the concentration of 1 M, was used as the electrolytic solution, and the separation membrane was used to prepare the lithium-sulfur battery.

EXAMPLE 2

The lithium-sulfur battery was prepared by using the same method as Example 1, except that zinc oxide having the diameter of 400 nm was used instead of aluminum oxide having the diameter of 400 nm in Example 1.

EXAMPLE 3

The lithium-sulfur battery was prepared by using the same method as Example 1, except that zirconium oxide having the diameter of 400 nm was used instead of aluminum oxide having the diameter of 400 nm in Example 1.

COMPARATIE EXAMPLE 1

The lithium-sulfur battery was prepared by using the same method as Example 1, except that applying of the polyaryleneether copolymer containing sulfonic acid lithium dispersed in DMSO (dimethylsuloxide) in Example 1 was omitted.

COMPARATIVE EXAMPLE 2

The lithium-sulfur battery was prepared by using the same method as Example 1, except that applying of the aluminum oxide having the diameter of 400 nm and the PVDF-HFP (polyvinylidene fluoride hexafluoropropylene) copolymer dispersed in acetone in Example 1 was omitted.

COMPARATIVE EXAMPLE 3

The lithium-sulfur battery was prepared by using the same method as Example 1, except that applying on the base material in preparation of the separation membrane in Example 1 was totally omitted.

COMPARATIVE EXAMPLE 4

On one lateral surface of the 16 μm polypropylene base material, the polyaryleneether copolymer containing sulfonic acid lithium dispersed in DMSO (dimethyl sulfoxide) and aluminum oxide having the diameter of 400 nm were mixed to be applied in the thickness of 5 μm and thus prepare the separation membrane.

The lithium-sulfur battery was prepared by using the same method as Example 1, except that the separation membrane was used.

EXPERIMENTAL EXAMPLE 1

The capacity maintenance ratio to the initial capacity and the stopping time of driving of the battery by the short-circuit were measured by 0.2 C/0.2 C charging/discharging, and the result is described in the following Table 1.

TABLE 1

|  | Initial capacity (mAh/g) | Capacity maintenance ratio after 100 cycles (%) | Short-circuit time of battery |
|---|---|---|---|
| Example 1 | 1050 | 92 | >500 cycle |
| Example 2 | 1050 | 91 | >500 cycle |
| Example 3 | 1050 | 91 | >500 cycle |
| Comparative Example 1 | 1100 | 64 | >500 cycle |
| Comparative Example 2 | 1050 | 91 | 170 cycle |
| Comparative Example 3 | 1100 | 62 | 130 cycle |
| Comparative Example 4 | 1050 | 63 | >500 cycle |

As described in Table 1, the lithium-sulfur battery of Example 1 has the high capacity maintenance ratio of 92% and the battery driving property of 500 cycles or more.

On the other hand, it can be seen that the lithium-sulfur battery of Comparative Example 1 using the separation membrane not including the first layer of the present application has the capacity maintenance ratio of about 70% of the capacity maintenance ratio of the lithium-sulfur battery of Example 1, in the lithium-sulfur battery of Comparative Example 2 using the separation membrane not including the second layer of the present application, the short-circuit occurs in driving of the battery of 300 cycles or less as compared to the battery short-circuit time of the lithium-sulfur battery of Example 1, and the lithium-sulfur battery of Comparative Example 3 not including both the first layer and the second layer of the present application has the lower capacity maintenance ratio and the faster battery short-circuit time than the lithium-sulfur battery of Example 1.

Further, it can be seen that in the case where the separation membrane is prepared by a monolayer constitution including both the lithium ion conductive compound and the metal oxide particles like Comparative Example 4 rather than a multilayer constitution of the first layer including the lithium ion conductive compound and the second layer including the metal oxide particles in preparation of the separation membrane, the capacity maintenance ratio is significantly reduced after 100 cycles as compared to Example 1.

Accordingly, the lithium-sulfur battery including the separation membrane according to the exemplary embodiment of the present application may have the high capacity maintenance ratio, and may have a battery short-circuit prevention effect by suppressing growth of the dendrite.

Although the exemplary embodiments of the present application are described with reference to the accompanying drawings, the present application is not limited to the exemplary embodiments but may be manufactured in different forms, and it will be apparent to those skilled in the art that various modifications and changes may be made thereto without departing from the essential feature of the application. Therefore, it should be understood that the above exemplary embodiments are illustrative only but are not limitative in all aspects.

The invention claimed is:

1. A separation membrane comprising:
a first layer including a lithium ion conductive compound having one or more functional groups selected from —$SO_3Li$, —COOLi, and —OLi; and
a second layer including an inorganic oxide particle and a binder,
wherein the lithium ion conductive compound is a copolymer including a repeating unit of the following Chemical Formula A and a repeating unit of the following Chemical Formula B:

[Chemical Formula A]

[Chemical Formula B]

in Chemical Formulas A and B,
m and n mean a number of the repeating units,
1≤m≤500 and 1≤n≤500,
$X_1$, $X_2$, and $X_3$ are the same as or different from each other, and are each independently represented by any one of the following Chemical Formulas 1 to 3,
$Y_1$ is represented by any one of the following Chemical Formulas 4 to 6,

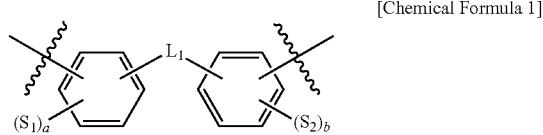

[Chemical Formula 1]

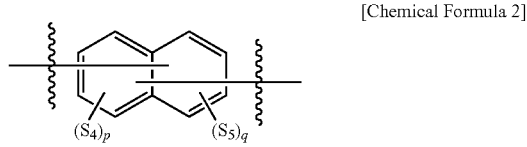

[Chemical Formula 2]

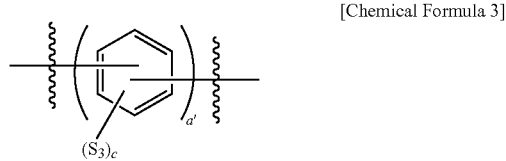

[Chemical Formula 3]

in Chemical Formulas 1 to 3, $L_1$ is a direct connection, or any one of —$CZ_2Z_3$—, —CO—, —O—, —S—, —$SO_2$—, —$SiZ_2Z_3$—, and a substituted or unsubstituted fluorenyl group, $Z_2$ and $Z_3$ are the same as or different from each other, and are each independently any one of hydrogen, an alkyl group, a trifluoromethyl group (—$CF_3$), and a phenyl group, $S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, a, b, c, p, and q are the same as or different from each other, and are each independently an integer of 0 or more and 4 or less, a' is an integer of 1 or more and 5 or less,

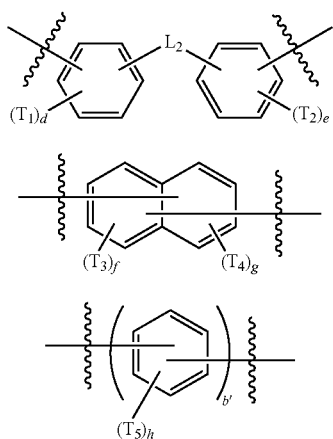

[Chemical Formula 4]

[Chemical Formula 5]

[Chemical Formula 6]

in Chemical Formulas 4 to 6, $L_2$ is a direct connection, or any one selected from —CO—, —$SO_2$—, and a substituted or unsubstituted fluorenyl group, d, e, f, g, and h are the same as or different from each other, and are each independently an integer of 0 or more and 4 or less, b' is an integer of 1 or more and 5 or less, and $T_1$ to $T_5$ are the same as or different from each other, at least one of $T_1$ to $T_5$ is each independently —$SO_3Li$, —COOLi, or —OLi and residuals are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

2. The separation membrane of claim 1, further comprising:
a third layer including a porous base material provided between the first layer and the second layer.

3. The separation membrane of claim 2, wherein the porous base material includes one or a mixture of two or more selected from a group consisting of high density polyethylene, low density polyethylene, linear low density polyethylene, ultrahigh molecular weight polyethylene, polypropyleneterephthalate, polyethyleneterephthalate, polybutyleneterephthalate, polyester, polyacetal, polyamide, polycarbonate, polyimide, polyetheretherketone, polyethersulfone, polyphenylene oxide, polyphenylene sulfide, and polyethylenenaphthalene.

4. The separation membrane of claim 2, wherein the porous base material has a pore size of 0.01 micrometer or more and 50 micrometers or less and a porosity of 5% or more and 95% or less.

5. The separation membrane of claim 1, wherein the inorganic oxide particle includes one or more selected from a group consisting of a hydrophilic inorganic oxide particle and an inorganic oxide particle having a lithium ion transporting ability.

6. The separation membrane of claim 5, wherein the hydrophilic inorganic oxide particle includes one or two or more selected from a group consisting of $SrTiO_3$, $SnO_2$, $CeO_2$, MgO, NiO, CaO, ZnO, $ZrO_2$, $Y_2O_3$, $Al_2O_3$, $TiO_2$, SiC, $BaTiO_3$, $HfO_2$, $Pb(Zr,Ti)O_3$ (PZT), $Pb_{1-x}La_xZr_{1-y}Ti_yO_3$(PLZT) (0<x<1, 0<y<1), and $PB(Mg_3Nb_{2/3})O_3$—$PbTiO_3$(PMN-PT).

7. The separation membrane of claim 5, wherein the inorganic oxide particle having the lithium ion transporting ability includes one or two or more selected from a group consisting of lithium phosphate ($Li_3PO_4$), lithium titanium phosphate ($Li_xTi_y(PO_4)_3$, 0<x<2, 0<y<1, 0<z<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13) and lithium lanthanum titanate ($Li_xLa_yTiO_3$,0<x<2, 0<y<3).

8. The separation membrane of claim 1, wherein a size of the inorganic oxide particle is 0.001 micrometer or more and 10 micrometers or less.

9. The separation membrane of claim 1, wherein a content of the inorganic oxide particle is 5 wt % or more and 99 wt % or less based on a total weight of a mixture including the inorganic oxide particle and the binder.

10. The separation membrane of claim 1, wherein a solubility parameter of the binder is 15 $MPa^{1/2}$ or more and 45 $MPa^{1/2}$ or less.

11. The separation membrane of claim 1, wherein the binder includes one or a mixture of two or more selected from a group consisting of polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, acrylonitrile-co-styrenebutadiene, and polyimide.

12. The separation membrane of claim 1, wherein the second layer has a pore size of 0.01 micrometer or more and 50 micrometers or less and a porosity of 5% or more and 95% or less.

13. The separation membrane of claim 1, wherein the binder connects the inorganic oxide particles, and pores are formed in the second layer due to at least one interstitial volume selected from an interstitial volume between the inorganic oxide particles and the binder; and an interstitial volume between the inorganic oxide particles.

14. A lithium-sulfur battery comprising:
a cathode;
an anode; and
the separation membrane of claim 1 positioned between the cathode and the anode.

15. The lithium-sulfur battery of claim 14, wherein in the lithium-sulfur battery, a first layer of the separation membrane is provided to be closer to the cathode, and a second layer of the separation membrane is provided to be closer to the anode.

16. The lithium-sulfur battery of claim 14, further comprising:
an electrolyte incorporated in the cathode, the anode, or the separation membrane.

17. A battery module comprising:
the lithium-sulfur battery of claim 14 as a unit battery.

* * * * *